(12) United States Patent
Kismarton et al.

(10) Patent No.: US 10,086,921 B2
(45) Date of Patent: Oct. 2, 2018

(54) AIRCRAFT HAVING A FORWARD-FACING SECTION THAT DEFLECTS ELASTICALLY UNDER IMPACT LOADS

(75) Inventors: Max U. Kismarton, Renton, WA (US); William J. Koch, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 2267 days.

(21) Appl. No.: 12/839,286

(22) Filed: Jul. 19, 2010

(65) Prior Publication Data
US 2010/0282904 A1    Nov. 11, 2010

Related U.S. Application Data

(63) Continuation-in-part of application No. 11/163,798, filed on Oct. 31, 2005.

(51) Int. Cl.
| | |
|---|---|
| *B64C 1/00* | (2006.01) |
| *B64C 1/12* | (2006.01) |
| *B29C 70/34* | (2006.01) |
| *B64C 1/06* | (2006.01) |
| *B29K 105/24* | (2006.01) |
| *B29L 31/30* | (2006.01) |

(52) U.S. Cl.
CPC .............. *B64C 1/00* (2013.01); *B29C 70/342* (2013.01); *B64C 1/068* (2013.01); *B64C 1/12* (2013.01); *B29K 2105/246* (2013.01); *B29K 2995/0089* (2013.01); *B29L 2031/3082* (2013.01); *B64C 2001/0072* (2013.01); *Y02T 50/43* (2013.01)

(58) Field of Classification Search
USPC .............................................. 244/129.1, 133
See application file for complete search history.

(56) References Cited

U.S. PATENT DOCUMENTS

| | | | |
|---|---|---|---|
| 4,741,943 A * | 5/1988 | Hunt | 428/113 |
| 5,843,558 A * | 12/1998 | Yoshizaki et al. | 428/112 |
| 6,510,961 B1 * | 1/2003 | Head et al. | 220/645 |
| 6,616,101 B2 * | 9/2003 | De Castro Nodal et al. | 244/123.3 |
| 2002/0069962 A1 | 6/2002 | Maxwell | |
| 2004/0070108 A1 | 4/2004 | Simpson | |
| 2006/0208135 A1 | 9/2006 | Liguore | |
| 2007/0095982 A1 * | 5/2007 | Kismarton et al. | 244/119 |

* cited by examiner

*Primary Examiner* — Brian M O'Hara
(74) *Attorney, Agent, or Firm* — Miller, Matthias & Hull LLP

(57) ABSTRACT

An aircraft comprises a forward-facing aircraft section including composite aircraft skin and a substructure for the skin. The substructure includes a plurality of hoop-shaped composite frames. The frames are designed to deflect elastically under bird impact loads.

17 Claims, 6 Drawing Sheets

FIG. 8

AIRCRAFT HAVING A FORWARD-FACING SECTION THAT DEFLECTS ELASTICALLY UNDER IMPACT LOADS

This is a continuation-in-part of U.S. Ser. No. 11/163,798 filed Oct. 31, 2005, still pending.

BACKGROUND

Forward-facing sections of commercial aircraft are vulnerable to bird strikes. These forward-facing sections include the aircraft nose.

A bird strike is a high energy impact. Consider a bird weighing 4 pounds. If that bird directly strikes a plane traveling at 500 mph, the resulting impact load will be very large, in the neighborhood of 60,000 lbs (60 kips).

Current practice is to make the nose section stiff and "bulletproof" in order to withstand these very large impact loads. Frames and stiffeners are made heavier and stiffer. However, these heavier structures add weight to an aircraft, which increases fuel costs and other costs of operating the aircraft.

Moreover, these heavier, stiffer composite structures can shatter and delaminate upon impact. Repair can be expensive, both in cost of the repair and downtime of the aircraft.

FAA Federal Aviation Regulations prescribes airworthiness standards for aircraft, including standards regarding bird strike events. The current practice of making frames heavier and stiffer will be even less desirable if future FAA regulations become more stringent with respect to bird strike events.

SUMMARY

According to an embodiment herein, an aircraft comprises a forward-facing aircraft section including composite aircraft skin and a substructure for the skin. The substructure includes a plurality of hoop-shaped composite frames. The frames are designed to elastically deflect under bird impact loads.

According to another embodiment herein, a nose section of an aircraft comprises composite aircraft skin and a substructure for the skin. The substructure includes a plurality of hoop-shaped composite frames, which are designed to deflect elastically under impact loads. At least one of the frames has a neutral plane and includes a base, a web extending from the base, and a cap extending from the web. The cap includes plies of longitudinal fibers and plies of transverse fibers. The longitudinal fibers are made of a material that strains substantially more than the transverse fibers and fibers in the skin. The cap is substantially further from the neutral plane than the skin.

According to another embodiment herein, a fuselage frame member comprises a base, a web extending from the base, and a cap extending from the web. The cap includes plies of longitudinal fibers and plies of transverse fibers. The longitudinal fibers are made of a material that strains substantially more than the transverse fibers. The transverse fibers are oriented at an angle $\pm\beta$ with respect to an A vector, and the longitudinal cap fibers are oriented at $\beta\alpha$ with respect to the A vector. Angle $\alpha$ is between 0 and ten degrees and angle $\beta$ is between 45 and 90 degrees.

DETAILED DESCRIPTION

Figure 1:
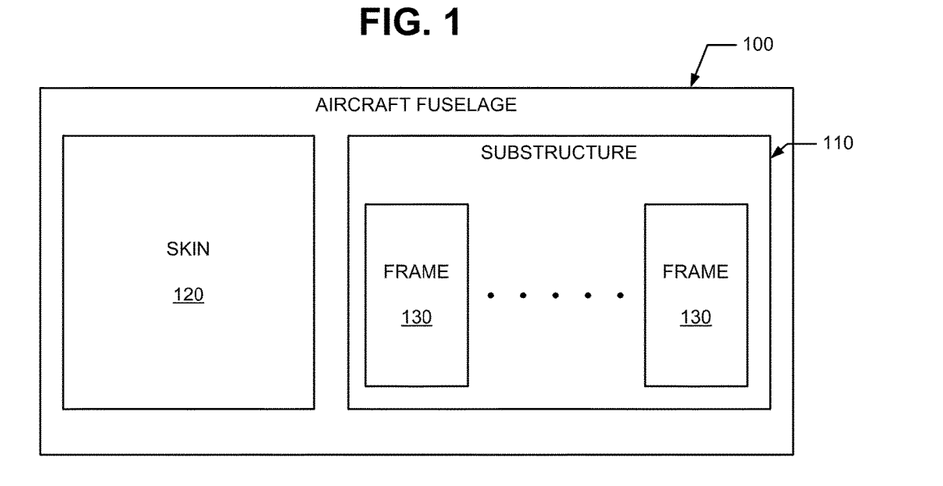
FIG. 1 is an illustration of aircraft terminology.

Reference is made to FIG. 1. The following terminology will be used herein. An aircraft fuselage 100 includes a substructure 110 and skin 120. The substructure 110 provides a stiffening architecture for the skin 120. The substructure 110 includes a collection of composite frames 130. The frames 130 are typically hoop-shaped. The substructure 110 further includes, but is not limited to, stiffeners and pad-ups (not shown).

Figure 2:
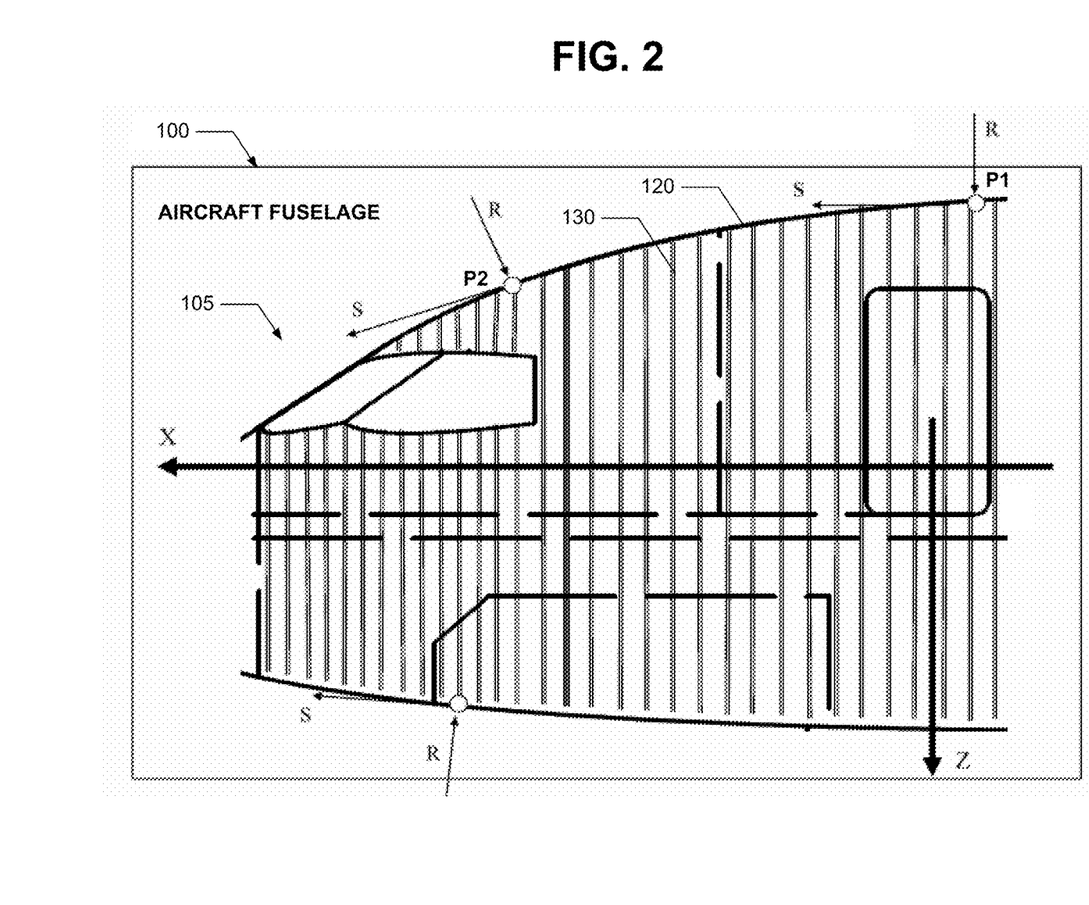
FIG. 2 is an illustration of a global (X-Y-Z) coordinate system for an aircraft and an R-S-T coordinate system for skin of the aircraft.

Reference is made to FIG. 2, which illustrates an aircraft fuselage 100 having a forward-facing section 105. In the embodiment of FIG. 1, the forward facing section 105 is a nose section 105. The nose section 105 includes skin 120 and a substructure. The substructure includes a plurality of frames 130. The skin 120 and frames 130 are designed to elastically deflect under impact loads. The frames 130 do not shatter and do not delaminate upon impact caused by a bird or other object. Instead, they deflect and return to their original shape without permanent damage. Consequently, expensive repair and aircraft downtime are avoided.

The aircraft fuselage 100 has the following global (X-Y-Z) Cartesian coordinate system, which does not change orientation regardless of which point (anywhere on the airplane) is being considered.

X=vector from tail to nose (straight forward) and is the axis of rotation of the cylindrical portion of the body.

Y=vector from middle of the fuselage towards the right wing tip.

Z=vector pointing down (when flying straight and level).

Any point P on the skin 120 of the aircraft fuselage 100 has the following local Cartesian coordinates (two points, P1 and P2, are provided as examples):

R=radial vector always normal to the surface of the skin 120 and pointing towards the axis of rotation of the fuselage.

S=vector always tangent to the body surface and pointing towards the nose. The S vector is approximately parallel to the X vector at the aircraft's mid body, but starts to cant towards the centerline as the nose is approached.

T=vector always tangent to the skin surface and always normal to the S vector.

Figure 3:
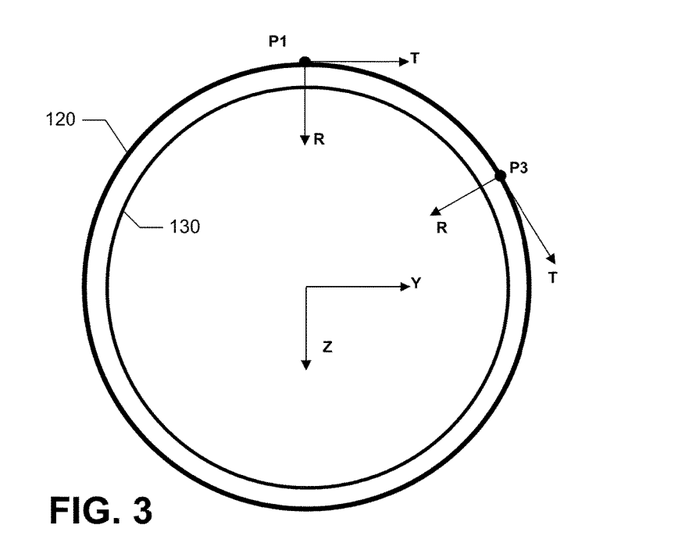
FIG. 3 is an illustration of the R-S-T coordinate system for different points on aircraft skin.

Additional reference is made to FIG. 3, which illustrates how the skin coordinate system rotates for different points on the skin. Two points are illustrated: P1 and P3. These two points lie along the same frame 130. For both points P1 and P3, the radial vector R points towards axis of rotation, and the tangential vector T points in the hoop direction.

Figure 4:
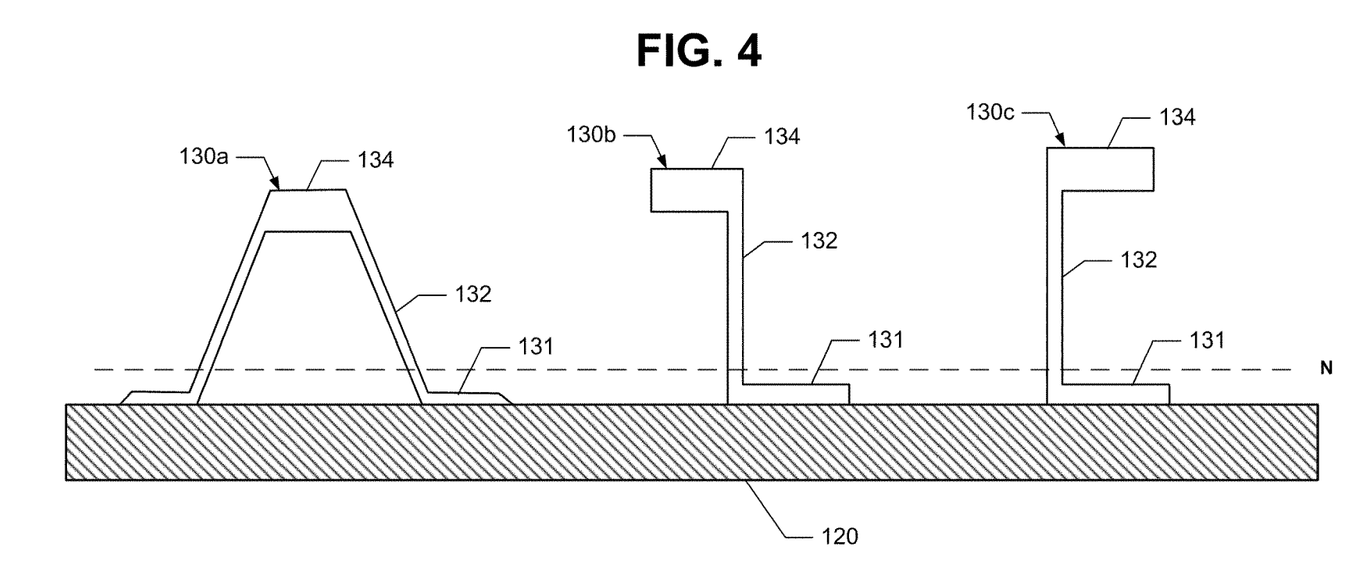
FIG. 4 is an illustration of different types of aircraft frames and an A-B-C coordinate system for caps of the frames.

Reference is now made to FIG. 4. A frame 130 is not limited to any particular geometry. Examples of frame geometries include, but are not limited to, hat frames, c-channels, Z-beams, J-beams, T-Beams and I-beams, and blade stiffened beams. In FIG. 4, hat frames 130a, Z-frames 130b and C-channels 130c are illustrated.

Each frame 130 includes a base 131, web 132 and a cap 134. The base 131 is attached to the skin 120. The web 132, which may be canted, is between the base skin and the 134. The cap 134 is spaced a distance d from the skin 120, where d is about 0.5 to 4 inches and preferably less than 2 inches. The cap 134 of the frame 130 has its own coordinate system:

A=vector along the length of the cap 134.
B=vector across the cap 134, usually pointing towards the nose of the aircraft.
C=vector normal to the cap's top surface, usually pointing to the axis of rotation of the fuselage.

The frame 130 has a neutral plane N. When the frame 130 is deflected, there is no stress or strain at the neutral plane N. The skin 120 and frame 130 are designed such that the skin 120 is 1.5 to 20 times closer to the neutral plane N than the cap 134. In most elastic structures, regardless of material or geometry, the amount of strain is always proportional to the distance from the neutral plane N. Thus, the cap 134 will experience much greater strain than the base 131 and skin 120.

Figure 5:
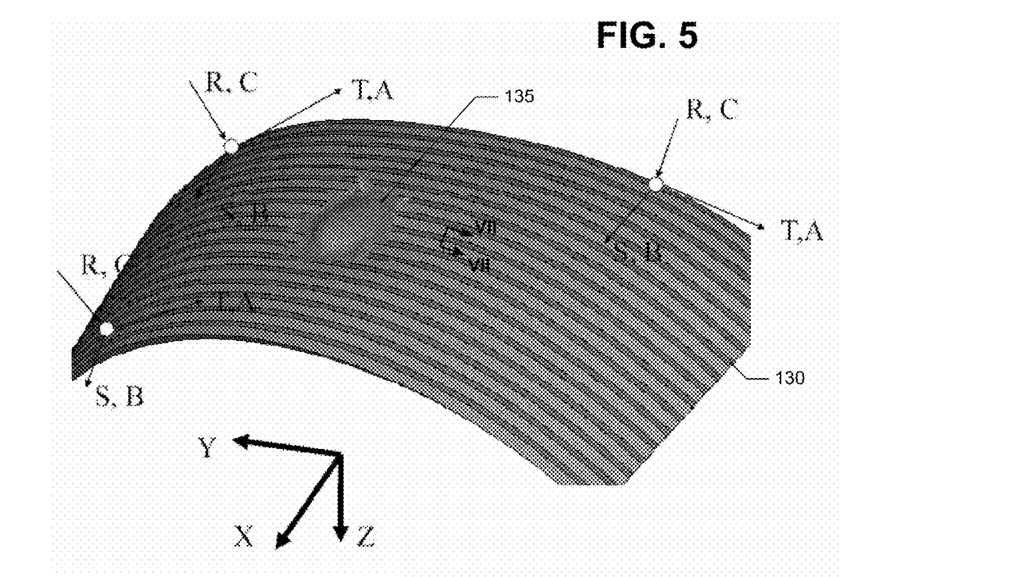
FIG. 5 is an isometric view of aircraft skin and an aircraft frame, a deformation caused by a bird strike, the X-Y-Z coordinate system, and an instance of the A-B-C, and R-S-T coordinate systems.

Additional reference is now made to FIG. 5, which further illustrates all 3 coordinate systems (X-Y-Z, R-S-T and A-B-C). FIG. 5 also illustrates a bowl-shaped deformation 135 that results from a bird strike. The impact load resulting from the bird strike is represented by the arrow L in FIG. 4. Before discussing how the frame 130 responds to the impact load L, fiber orientation in the skin 120 and frame 130 will be discussed.

Figure 6:
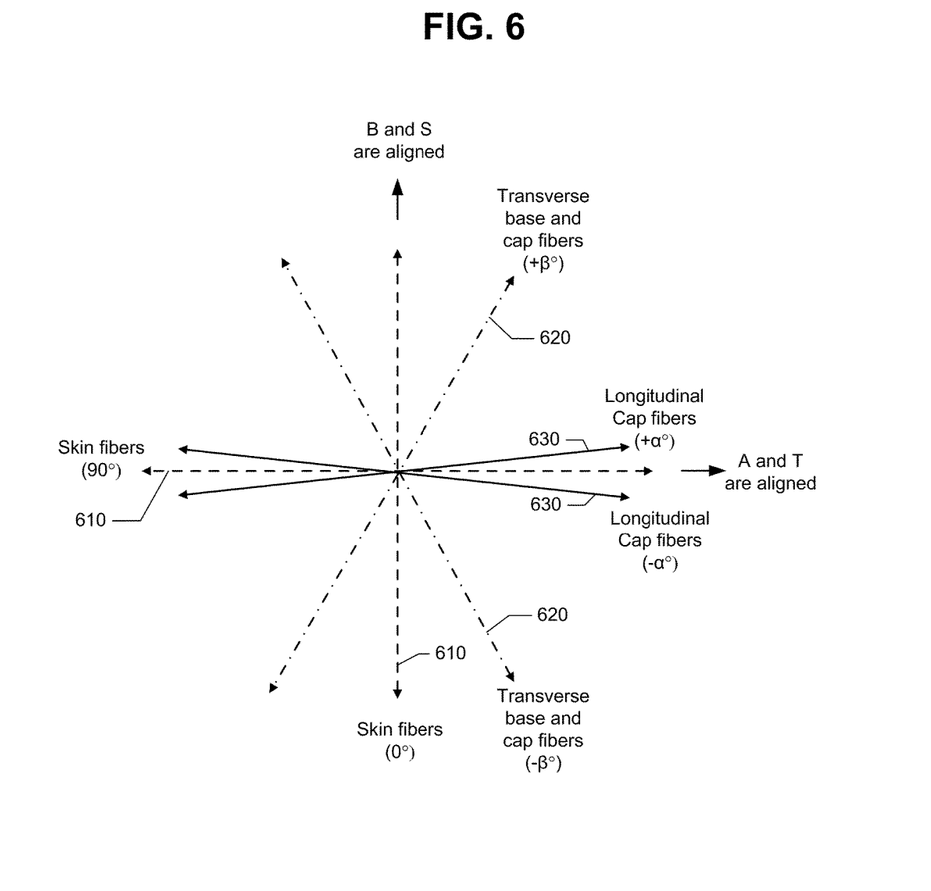
FIG. 6 is an illustration of principal fiber directions in a frame and skin.

Additional reference is now made to FIG. 6, which illustrates the orientation of various reinforcing fibers in the skin 120 and frame 130. The skin 120 has multiple plies of reinforcing fibers 610. Different plies have fibers oriented at 0, +45, −45 and 90 degrees relative to the S vector in the S-T plane (only the 0 and 90 degree orientations are illustrated as dash lines in FIG. 6). Some embodiments may have a quasi isotropic layup for the skin 120, whereby equal amounts and percentages of 0, +45, −45, and 90 degree plies are used. In other embodiments, the different plies could include reinforcing fibers oriented at 10, −55, +100 and −35 degrees, or some other angles or combinations. Still other embodiments may have the different plies with reinforcing fibers oriented at 0, +45, and −45 degrees. The skin fibers 610 may be an intermediate modulus (22-25 MSI) carbon fiber. These skin fibers 610 can strain up to 0.010 inches/inch, but in practice are only allowed to strain up to about 0.003 inches/inch.

The base 131, web 132 and cap 134 include reinforcing fibers oriented at an angle ±β respect to the A vector in the A-B plane. The value of β is between 45 and 90 degrees (in one embodiment, R=60 degrees). These fibers will be referred to as "transverse fibers." The transverse reinforcing fibers may be carbon fibers that strain 0.005 to 0.010 in/in.

The transverse fibers 620 in the base 131 and cap 134 are shown as dot-dash lines in FIG. 6. The transverse fibers in the web 132, which can be canted, are not illustrated for simplicity.

In addition to having transverse frame fibers 620, the cap 134 also includes longitudinal fibers 630. The longitudinal cap fibers 630 are illustrated as solid lines in FIG. 6. The longitudinal cap fibers 630 are oriented at an angle ±α with respect to the A vector. The value of α is between 0 and ten degrees in the AB plane.

The cap 630 will have multiple plies of longitudinal fibers. The angle α can be varied in these plies (that is, different plies have different values of α).

The longitudinal cap fibers 630 strain about two to ten times more than the transverse frame fibers 610 and the reinforcing fibers 610 in the skin 120. The longitudinal cap fibers 630 may be high strain fibers such as Spectra® fibers, Vectran™ fibers, low modulus graphite (GR), or fiberglass. For example, the longitudinal cap fibers 630 may be made of fiberglass that can strain 0.025 in/in.

In some embodiments, the cap 134 has interleaved plies of transverse and longitudinal fibers 620 and 630. The interleaving creates a more intimate connection with the skin 120 so internal stresses are transmitted better from the cap 134 to the skin 120. In other embodiments, the transverse and longitudinal fibers 620 and 630 can be grouped to form adjacent sections, with the section made of longitudinal fibers 630 being further from the skin.

Now consider an impact load on the skin 120, directly over a frame 130 (if the impact load was between frames 130, the skin 120 would distribute the impact load L to the frames 130). At the point of impact, the skin 120 and frame 130 deflect together. The skin 120 bends and strains, but not as much as the cap 134, because the cap 134 is further from the neutral plane N.

The longitudinal fibers 630 in the cap 134 are angled to see an entire strain field resulting from the impact load. The transverse fibers 620 in the cap 134 are angled so as to see a fraction (about 10 to 60%) of the entire strain field. Thus, the longitudinal fibers 630 in the cap 134 experience the full strain field, while the transverse fibers 620 in the cap 134 do not. The transverse fibers 620 in the base 131 also undergo less strain because they are much closer to the neutral plane N.

The frame 130 is a compliant structure that, instead of crushing or rupturing during a high energy impact load, deflects and returns to its original shape without incurring damage. In some embodiments, the skin 120 and frame members 130 can deflect approximately 0.5 to 3 inches under a high energy impact load L. As a result of the deflection, the frame 130 achieves a 1-3 times reduction in reaction load. Whereas a stiff frame would experience a reaction load of 60 kips, the frame 130 herein would achieve a reaction load of 20 kips.

The frame 130 can handle the same impact energy as a conventional frame, but the frame 130 weighs significantly less. If FAA regulations become more stringent regarding bird strike events, the difference in weight will be even more significant.

Figure 7:
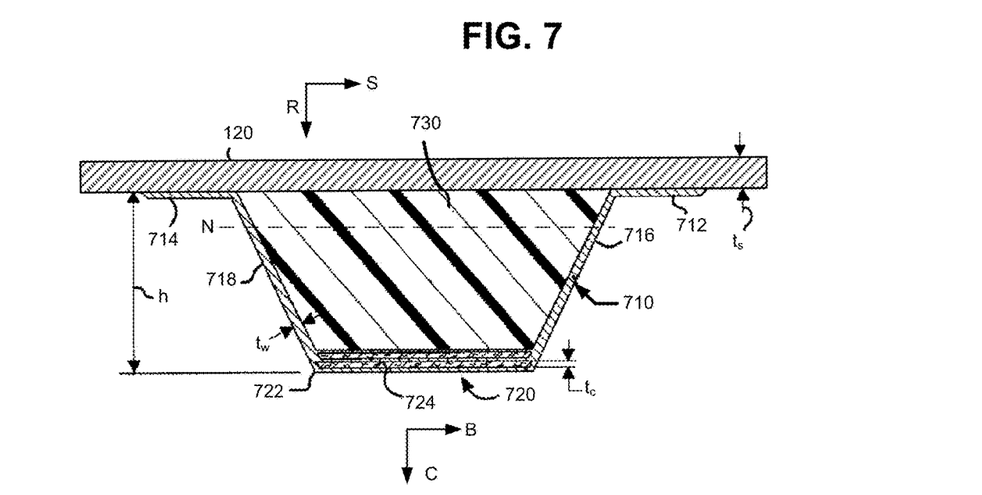
FIG. 7 is a cross-sectional view of aircraft skin and an aircraft frame, the cross-section taken along lines VII-VII in FIG. 5.

Reference is now made to FIG. 7, which shows a cross-section of a circumferential frame known as a "hat frame" 710. The hat frame 710 includes first and second bases 712 and 714, which are attached to skin 120. First and second angled webs 716 and 718 extend from their respective bases 712 and 714 toward a cap 720.

In some embodiments, the hat frame 710 may have a wall thickness $t_w$ of approximately 0.05-0.15 inches. The cap height h is between 0.7 and 4 inches and preferably less than 2 inches.

The cap 720 of FIG. 7 has a pair of cap elements 722 and 724 that interleaved. The cap element 722 may use stiffer transverse fibers. The longitudinal fibers of cap element 724 include plies of fiberglass or S-2 glass fibers. Each cap element 722 and 724 is between 0.5 inches and 2 wide and a thickness $t_c$ between 0.08 inches and 0.15 inches. Total thickness is between 0.08 and 0.25 inches.

A hat frame interior region is located between the cap 720, skin 120 and webs 716 and 718. This interior region can be hollow or filled with a lightweight material 730, such as honeycomb core or foam. For instance, a foam element 730 (3 to 15 lbs/ft$^3$) can be tailored to individual impact energies. The foam element 730 allows for a further tailoring of impact resistance without negatively impacting either weight or the low modulus nature of the hat frame 710 and skin 120 interaction that provides compliance and prevents damage or debonding during impact.

In some embodiments, the skin 120 has a constant thickness $t_s$. In other embodiments, the skin 120 has a thickness $t_s$ that varies from zone to zone as a function of bird impact energy. In these other embodiments, the skin 120 is thickest in zones having the highest bird impact energy, and it becomes thinnest at the constant cross-section of aircraft fuselage 100. For example, the skin could be about 0.5 in thick at the zones having the highest bird impact energy, and 0.050 in thick at the constant cross-section.

By varying the thickness $t_s$ of the skin 120, weight of the aircraft can be reduced. Reducing the weight is advantageous because it reduces aircraft operating costs (e.g., fuel costs).

Weight reduction can also be achieved in the substructure 110. In some embodiments, the nose section 105 may be stringerless (that is, it has no stringers). Downstream sections of the fuselage may include an ortho-grid of hoop-shaped frames and longitudinally extending stringers. The stringers provide strength in bending.

In other embodiments, the stringers may be tapered. Bending of the fuselage is highest near the mid-point, and tapers to near zero at the ends of the aircraft. The stringers may thus be tapered as a function of the bending loads. Eliminating some stringers and tapering other stringers can result in a substantial weight reduction.

Figure 8:
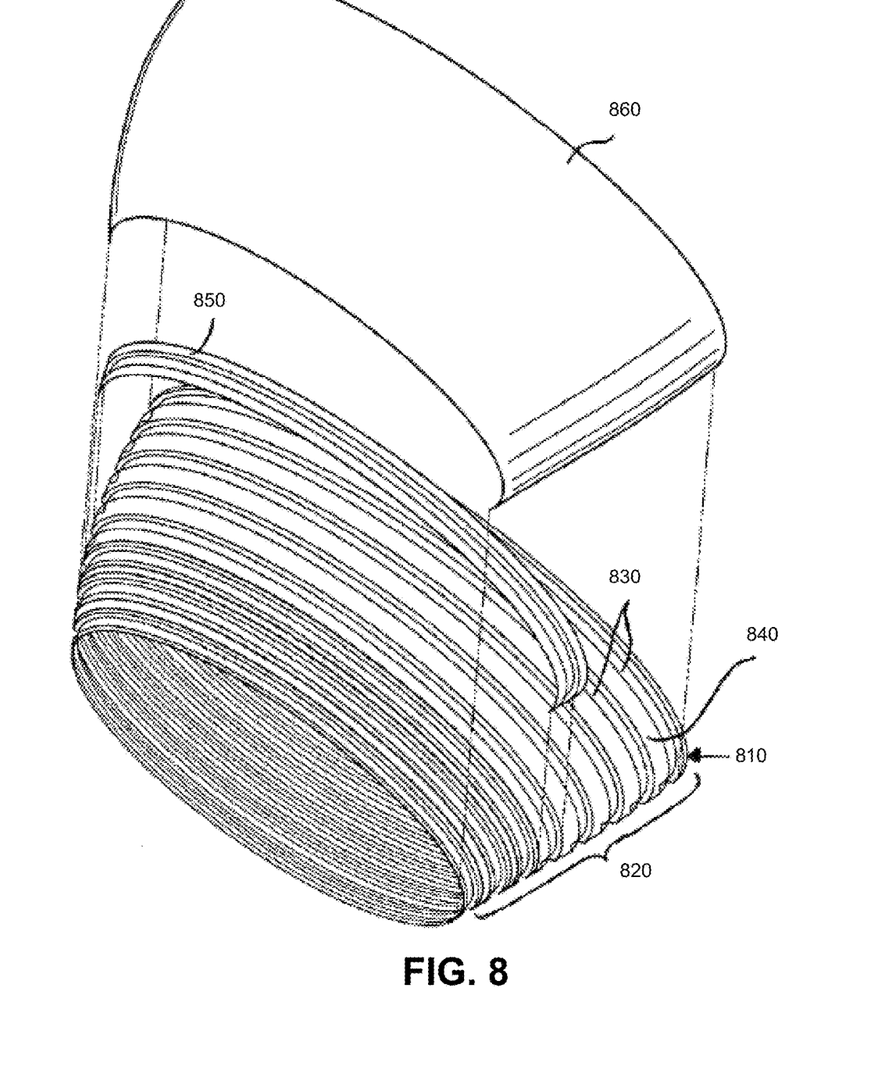
FIG. 8 is an illustration of a lay-up tool for fabricating a barrel section of a fuselage.

Reference is now made to FIG. 8, which illustrates a layup tool 810 for fabricating a fuselage barrel section having integrated skin 120 and hat frames 710. The lay-up tool 810 includes a plurality of multi-curved shapes 820 along its length. The lay-up tool 810 further includes a plurality of grooves 830 on its outer tool surface 840. The grooves 830 are configured to allow hat frame fibers 850 to be laid up directly onto the grooves 830 and thereby form a hat frame 710. The grooves 830 further allow the hat fames 710 to be located precisely in relation to both each other and the overall fuselage barrel section.

During fabrication, plies of hat frame fibers 850 are laid up directly onto the grooves 830. Hat frame web plies can be defined in the flat condition before being deformed into a hat frame shape. Plies of cap fibers (e.g., carbon and fiberglass) are laid up directly into the grooves 830. Foam or a honeycomb core can be introduced at this point.

Plies of skin fibers 860 are then laid-up over the hat frame fibers 850. The layup is then cured. Thus, the hat frames 710 are fully integrated into the skin 120 and co-cured to form a unitary fuselage section.

In some embodiments, a bladder may be placed in the interior region of the hat frame layup, prior to laying up the skin fibers 860. Then the skin fibers 870 are laid up. During curing, the bladder provides outward pressure against those substructure portions underneath the skin 120. Pressure is applied to the skin 120 by the layup tool 810 and a vacuum bag. Tooling other than a bladder (e.g., trapped rubber) may be used to provide the outward pressure.

The invention claimed is:

1. An aircraft comprising a forward-facing aircraft section including composite aircraft skin and a substructure for the skin, the substructure including a plurality of hoop-shaped composite frames designed to deflect elastically under bird impact loads.

2. The aircraft of claim 1, wherein the skin and frames deflect elastically approximately 0.5 to 3 inches under a bird impact event.

3. The aircraft of claim 1, wherein the forward-facing section is a nose section of a fuselage.

4. The aircraft of claim 1, wherein at least one of the frames includes a base attached to the skin, a cap, and a web between the base and the cap, wherein the base and web include transverse reinforcing fibers and the cap includes transverse and longitudinal reinforcing fibers, wherein the longitudinal fibers strain about 2 to 10 times more than the transverse fibers; wherein the longitudinal fibers in the cap are angled to see an entire strain field resulting from an impact load; and wherein the transverse fibers in the base, web and cap are angled so as to see a fraction of the entire strain field.

5. The aircraft of claim 4, wherein the cap is spaced about 0.5 to 4 inches apart from the skin.

6. The aircraft of claim 4, wherein the composite skin includes reinforcing fibers; and wherein the longitudinal cap fibers strain between 2 to 10 times more than the skin fibers.

7. The aircraft of claim 6, wherein the longitudinal cap fibers include glass fibers, and skin fibers include carbon fibers.

8. The aircraft of claim 4, wherein the transverse fibers are oriented at an angle ±β with respect to an A vector, and wherein the longitudinal cap fibers are oriented at ±α with respect to the A vector, where angle α is between 0 and ten degrees and angle β is between 45 and 90 degrees.

9. The aircraft of claim 4, wherein the at least one frame has a neutral plane that is 1.5 to 20 times closer to the skin than the cap.

10. The aircraft of claim 4, wherein the transverse fibers in the base, web and cap are angled so as to see about 10 to 60% of the entire strain field.

11. The aircraft of claim 1, wherein the skin is quasi-isotropic in ply directions.

12. The aircraft of claim 1, wherein the forward-facing section is a nose section; and wherein the substructure in the nose section is stringerless.

13. The aircraft of claim 12, further comprising an additional section downstream of the nose section, the downstream section including skin and an ortho-grid of circumferential frames and longitudinally extending stringers, the stringers providing strength in bending.

14. The aircraft of claim 1, wherein the frames include hat frames, each hat frame having a cap, first and second webs that are angled with respect to the cap, and first and second bases that extend from the first and second webs, the bases on the skin.

15. The aircraft of claim 14, wherein the cap includes longitudinal fibers and transverse fibers, wherein the longitudinal fibers strain 2 to 10 times more than the transverse fibers.

16. The aircraft of claim 15, wherein the longitudinal fibers include fiberglass fibers and the transverse fibers include carbon fibers.

17. A nose section of an aircraft, the nose section comprising composite aircraft skin and a substructure for the skin, the substructure including a plurality of hoop-shaped composite frames, the frames designed to deflect elastically under impact loads, at least one of the frames having a neutral plane and including:

a base;

a web extending from the base; and a cap extending from the web, the cap including plies of longitudinal fibers and plies of transverse fibers, the longitudinal fibers made of a material that strains substantially more than the transverse fibers and fibers in the skin, the cap substantially further from the neutral plane than the skin.

* * * * *